US012747721B2

(12) United States Patent
Sun et al.

(10) Patent No.: US 12,747,721 B2
(45) Date of Patent: Sep. 29, 2026

(54) FIBER FABRIC AND BLADE OF WIND TURBINE WITH THE SAME

(71) Applicant: Envision Energy Co., Ltd., Jiangsu (CN)

(72) Inventors: Xiaoyu Sun, Jiangsu (CN); Xiangyang Zhang, Jiangsu (CN); Sunil Yellavenkata Jonnalagadda, Jiangsu (CN); Hao Ma, Jiangsu (CN); Terndrup Overgaard Christian Lars, Jiangsu (CN)

(73) Assignee: Envision Energy Co., Ltd., Jiangsu (CN)

( * ) Notice: Subject to any disclaimer, the term of this patent is extended or adjusted under 35 U.S.C. 154(b) by 0 days.

(21) Appl. No.: 19/054,745

(22) Filed: Feb. 14, 2025

(65) Prior Publication Data

US 2025/0179992 A1 Jun. 5, 2025

Related U.S. Application Data

(63) Continuation of application No. PCT/CN2022/112750, filed on Aug. 16, 2022.

(51) Int. Cl.

*F03D 17/00* (2016.01)
*B32B 5/12* (2006.01)

(Continued)

(52) U.S. Cl.

CPC .............. *F03D 17/003* (2023.08); *B32B 5/12* (2013.01); *B32B 5/26* (2013.01); *D04B 1/10* (2013.01);

(Continued)

(58) Field of Classification Search

CPC ................ Y02E 10/72; B32B 2250/20; B32B 2262/0276; B32B 2262/101;

(Continued)

(56) References Cited

U.S. PATENT DOCUMENTS

| | | | | |
|---|---|---|---|---|
| 6,992,029 | B1 | 1/2006 | Chou | |
| 2011/0315303 | A1* | 12/2011 | Bird | D03D 15/267 442/187 |

(Continued)

FOREIGN PATENT DOCUMENTS

| | | | |
|---|---|---|---|
| CN | 201428038 | Y | 3/2010 |
| CN | 103161021 | A | 6/2013 |

(Continued)

OTHER PUBLICATIONS

Envision Energy Co., Ltd., European Search Report, EP22955256.7, Aug. 4, 2025, 5 pgs.

(Continued)

*Primary Examiner* — Arti Singh-Pandey

(74) *Attorney, Agent, or Firm* — USCH Law, PC

(57) ABSTRACT

The present disclosure provides a defect-detectable fiber fabric, including a plurality of bunches of fibers and a plurality of braided threads configured to respectively fix together fibers of each bunch of fibers. The plurality of braided threads include first braided threads each having a color different from a color of any of the plurality of bunches of fibers, and a respective distance between every two adjacent first braided threads is configured to make wrinkle defects that could be formed in fabric layers detectable. After the curing and molding, the positions of the defects and the layer(s) where the defects are formed can be determined according to the states of the first braided threads.

14 Claims, 1 Drawing Sheet

(51) Int. Cl.

| | |
|---|---|
| ***B32B 5/26*** | (2006.01) |
| ***D04B 1/10*** | (2006.01) |
| ***D04B 1/12*** | (2006.01) |
| ***G06T 7/00*** | (2017.01) |

(52) U.S. Cl.
CPC ............... *D04B 1/102* (2013.01); *D04B 1/12* (2013.01); *D04B 1/126* (2013.01); *F03D 17/013* (2023.08); *F03D 17/0285* (2023.08); *G06T 7/0004* (2013.01); *B32B 2250/20* (2013.01); *B32B 2262/0276* (2013.01); *B32B 2262/101* (2013.01); *B32B 2307/404* (2013.01); *B32B 2603/00* (2013.01); *F05B 2260/83* (2013.01); *F05B 2280/6001* (2013.01); *G06T 2207/30164* (2013.01)

(58) Field of Classification Search
CPC ..... B32B 307/404; B32B 603/00; B32B 5/12; B32B 5/26; D03D 11/00; D03D 13/00; D03D 15/267; D03D 15/283; D03D 15/54; F03D 17/013; F03D 17/0285; F03D 80/502; F03D 2260/83; F03D 2280/6001; D04B 1/10; D04B 1/102; D04B 1/12; D04B 1/126
See application file for complete search history.

(56) References Cited

U.S. PATENT DOCUMENTS

| | | | | |
|---|---|---|---|---|
| 2013/0114088 | A1 | 5/2013 | Newman | |
| 2024/0078654 | A1* | 3/2024 | Miller | F03D 17/00 |

FOREIGN PATENT DOCUMENTS

| | | | | |
|---|---|---|---|---|
| CN | 103498281 | A | 1/2014 | |
| CN | 104541303 | A | 4/2015 | |
| CN | 107084098 | A | 8/2017 | |
| CN | 107130365 | A | 9/2017 | |
| CN | 109099837 | A * | 12/2018 | G01N 21/88 |
| DE | 102011056415 | A1 | 6/2013 | |
| WO | 2021121545 | A1 | 6/2021 | |

OTHER PUBLICATIONS

Envision Energy Co., Ltd., European Communication pursuant to Article 94(3) EPC, EP22955256.7, Aug. 4, 2025, 7 pgs.
Envision Energy Co., Ltd., International Search Report with English translation, PCT/CN2022/112750, Apr. 27, 2023, 5 pgs.

* cited by examiner

FIBER FABRIC AND BLADE OF WIND TURBINE WITH THE SAME

CROSS REFERENCE TO RELATED APPLICATIONS

The present application is a continuation of PCT Patent Application No. PCT/CN2022/112750, filed Aug. 16, 2022, which is incorporated by reference herein in its entirety.

TECHNICAL FIELD

The present disclosure relates to the technical field of wind power generation, and in particular to a defect-detectable fiber fabric, and to a blade of a wind turbine fabricated using the fiber fabric.

BACKGROUND

With the continuous development of wind power generation technology, the number of megawatts generated per wind turbine is also increasing, resulting in continuously increased diameter (in other words, a length of a blade) of an impeller of a wind turbine. The increased length of blade must lead to increased weight of blade. In the actual production process, the weight of the blade of the wind turbine is limited to the performance of the hub and tower of the wind turbine, which makes the weight of the blade of the wind turbine become the bottleneck for increasing the number of megawatts generated per wind turbine.

At present, in order to reduce the weight of the blade of the wind turbine, glass fiber fabric is commonly used to fabricate the housing of the blade of the wind turbine by layering and injection molding. During laying fabric on a large area, wrinkles of fabric may occur, which may induce slight bending and deformation in the housing of the blade that being laminated and gradually spread until the housing of the blade cracks in the entire thickness. Therefore, timely detection of defects of wrinkles during manufacturing is extremely important for improving the production quality of the blade of the wind turbine.

The currently used glass fiber fabric and braided threads thereof for manufacturing the blade of the wind turbine are all white, and specialized equipment is therefore required to detect the defects. With the increase of the size of the profile of the blade, the time required to detect the wrinkles beneath or on the surface of glass fiber fabric increases significantly, resulting in low detection efficiency. In addition, when positioning the wrinkles that occur during injection and curing, it is necessary to completely polish the fabric layer above the wrinkles, resulting in irreparable damage.

SUMMARY

In order to address some of or all the problem in the related technologies, the present disclosure provides, on the one hand, a defect-detectable fiber fabric including first braided threads each having a color different from a color of any of the plurality of bunches of fibers, and a respective distance between every two adjacent braided threads of the first braided threads is configured to make wrinkle defects that could be formed in the plurality of fabric layers detectable.

In some embodiments, a relative color difference between the color of the first braided threads and the color of the plurality of bunches of fibers is greater than or equal to 3. The relative color difference is calculated based on color parameters output from color modes issued by CIELAB in 1976.

In some embodiments, the first braided threads have one or more colors.

In some embodiments, a number of colors of the first braided threads is less than or equal to 20.

In some embodiments, the fiber fabric further includes second braided threads having a color same as the color of the plurality of bunches of fibers.

In some embodiments, a ratio of the first braided threads to the second braided threads ranges from 1:10 to 1:500.

In some embodiments, a ratio of the first braided threads to the second braided threads ranges from 1:10 to 1:100.

In some embodiments, a ratio of the first braided threads to the second braided threads ranges from 1:10 to 1:50.

In some embodiments, the plurality of braided threads are arranged along a zero-degree-direction of the defect-detectable fiber fabric.

In some embodiments, the respective distance between every two adjacent braided threads of the first braided threads is 11 to 501 times a width of one bunch of fibers of the plurality of bunches of fibers.

In some embodiments, the respective distance between every two adjacent braided threads of the first braided threads is 11 to 101 times a width of one bunch of fibers of the plurality of bunches of fibers.

In some embodiments, the respective distance between every two adjacent braided threads of the first braided threads is 11 to 51 times a width of one bunch of fibers of the plurality of bunches of fibers.

In some embodiments, the plurality of braided threads are made of glass fiber or polyester fiber.

In some embodiments, the defect-detectable fiber fabric is monoaxial glass fiber fabric, biaxial glass fiber fabric, or triaxial glass fiber fabric, and the defect-detectable fiber fabric includes at least one of main-direction glass fibers or weft glass fibers having a color of white.

In some embodiments, the defect-detectable fiber fabric is fabricated using tricot stitches, derivative tricot stitches, two-bar-derivative tricot stitches, or pillar stitches.

On the basis of the defect-detectable fiber fabric illustrated above, the present disclosure provides, on the other hand, a blade of a wind turbine. The blade has at least one component including the defect-detectable fiber fabric illustrated above. The respective distance between every two adjacent first braided threads of the defect-detectable fiber fabric is configured to make wrinkle defects that could be formed in the blade detectable.

In some embodiments, first braided threads of one respective layer of the defect-detectable fiber fabric of the plurality of layers of the defect-detectable fiber fabric have a color different from colors of first braided threads of remaining layers of the defect-detectable fiber fabric of the plurality of layers of the defect-detectable fiber fabric.

On this basis, the present disclosure further provides a method for detecting defects in a blade of a wind turbine, including:

- determining, during laying the defect-detectable fiber fabric, profile-fitting degree and straightness of the defect-detectable fiber fabric by observing contours of the first braided threads; and/or
- after injection molding of the blade, determining, by observing the contours of the first braided threads arranged along an extension direction of the blade, whether any wrinkle defect is formed and positions of defects in response to the defects being formed.

In some embodiments, the method further includes: identifying automatically the defects using an image recognition system.

On this basis, the present disclosure further provides an image recognition system configured to detect defects in a blade of a wind turbine, where the blade includes the defect-detectable fiber fabric illustrated above. A detection of the defects includes:

- determining, during laying the defect-detectable fiber fabric, profile-fitting degree and straightness of the defect-detectable fiber fabric by observing contours of the first braided threads; and/or
- after injection molding of the blade, determining, by observing the contours of the first braided threads arranged along an extension direction of the blade, whether any wrinkle defect is formed and positions of defects in response to the defects being formed. The positions of the defects include positions where the first braided threads are bent or wrinkled.

The present disclosure is based on the following insight of the inventor: the existing detection of the contour of the blade of a wind turbine includes non-destructive detection and destructive detection. The non-destructive detection mainly includes usage of X-ray, ultrasonic, acoustic emission, light sensor, thermal infrared imaging technology, and the like. However, the non-destructive detection has certain limitations, such as being not suitable for on-site detection, poor detection accuracy, or poor stability. After research, the inventor found that the defects of a blade of a wind turbine are usually caused by fabric wrinkles in the manufacturing process. However, due to the fact that the glass fibers and braided threads thereof of the fabric used in the existing blades are white, it is extremely difficult and inefficient to detect the wrinkles in the manufacturing process. Therefore, the present disclosure provides a defect-detectable fiber fabric, in which some of or all the white braided threads used in the existing fiber fabric are replaced with colored braided threads, such that in the process of laying the fiber fabric on a large area, the bending degree of the fiber fabric can be recognized based on the state of the colored braided threads, and whether wrinkles are formed can be determined. Moreover, after the injection molding of the blade, the state of the colored braided threads can still be observed with the naked eye external to the blade, so as to accurately identify the defects, determine the positions of the defects, and determine the layer(s) where the defects are formed. In this way, large-area destructive maintenance caused by detection can be prevented.

BRIEF DESCRIPTION OF THE DRAWINGS

In order to further clarify the above and other advantages and features of the embodiments of the present disclosure, a more specific illustration of the embodiments of the present disclosure will be provided with reference to the accompanying drawings. It shall be understood that these drawings depict only typical embodiments of the present disclosure and shall not be considered as limiting the scope of the present disclosure. In the drawings, for clarity, the same or corresponding components will be denoted by the same or similar reference numerals.

DETAILED DESCRIPTION OF THE EMBODIMENTS

Figure 1:
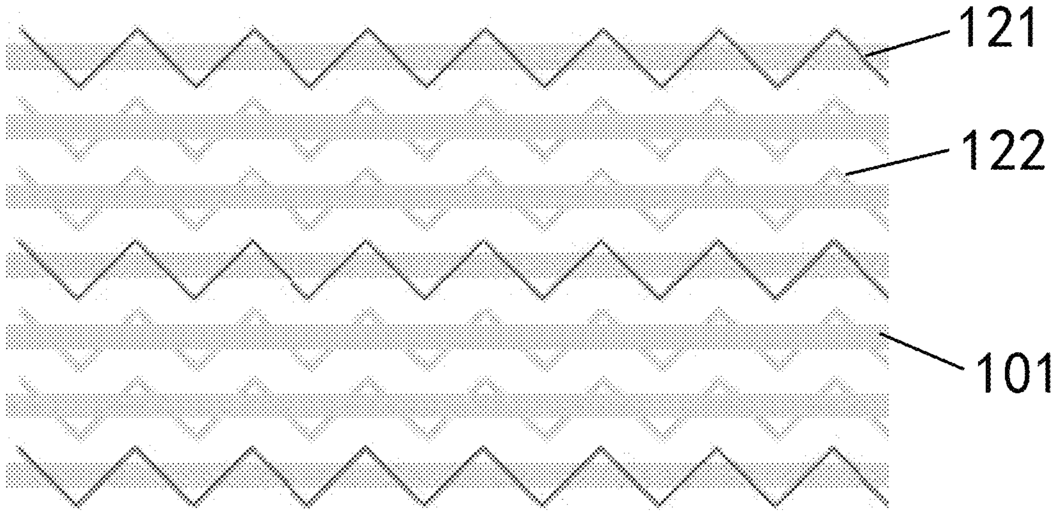
FIG. 1 shows a schematic diagram of a structure of a defect-detectable fiber fabric according to some embodiments of the present disclosure.

In the following illustration, the present disclosure is illustrated with reference to the embodiments. However, those skilled in the art will recognize that the embodiments may be implemented without one or more specific details or in conjunction with other alternative and/or additional methods, materials or assemblies. In other cases, well-known structures, materials or operations are not shown or illustrated in detail to prevent from blurring the key points of the present disclosure. Similarly, specific numbers, materials, and configurations have been set forth for purposes of explanation in order to provide a comprehensive understanding of the embodiments of the present disclosure. However, the present disclosure is not limited to these specific details. In addition, it should be understood that the embodiments shown in the drawings are illustrative and are not necessarily drawn to the actual scale.

In the present disclosure, unless otherwise specified, "arranged on", "arranged above" and "arranged over" do not exclude the existence of an intermediate object between the two. In addition, "arranged on or above" only indicates the relative position relationship between two components, and in certain cases, such as after reversing the orientation of the product, it may be converted to read "arranged under or below", and vice versa.

In the present disclosure, unless otherwise specified, the quantifiers "a" and "an" do not exclude the case where a plurality of elements present.

It should be further pointed out that within the scope of the present disclosure, the terms "same", "equivalent", "equal to" and the like do not mean that the two values are absolutely equal, but allow certain reasonable errors, that is to say, the terms shall be further interpreted as "basically the same", "basically equivalent", "basically equal to". Similarly, in the present disclosure, the terms "perpendicular to", "parallel to" and the like indicating the direction relationship also shall be further interpreted as "basically perpendicular to" and "basically parallel to".

It is noted that the embodiments of the present disclosure illustrate the steps of a process in a specific order, but this is only for the purpose of describing the specific embodiment, rather than defining the sequence of the steps. On the contrary, in the embodiments of the present disclosure, the sequence of the steps may be adjusted according to the adjustment of the process.

In order to address the problem that the existing defect detection of blades of a wind turbine is inefficiency and may require destructive maintenance or detection, the present disclosure provides a defect-detectable fiber fabric, in which some of or all the white braided threads used in the existing fiber fabric are replaced with colored braided threads, such that in the process of laying the fiber fabric on a large area, the bending degree of the fiber fabric can be visually recognized based on the state of the colored braided threads, and whether wrinkles are formed can be determined. In this way, the detection efficiency can be improved significantly. Moreover, after the injection molding of the blade, the defects can still be quickly identified, and the positions of the defects and the layer(s) where the defects are formed can be accurately determined, by directly observing the state of the colored braided threads with the naked eye external to the blade. In this way, destructive maintenance or detection can be prevented. On this basis, in the present disclosure, the colored braided threads may also be referred to as colored threads or tracer threads.

It should be understood that the above-mentioned fiber fabric may also be applied to other products manufactured by layering of fiber fabric and injection molding, and the principle of detection and positioning of the defects is the same as that for the blades of wind turbines.

The solutions of the present disclosure will be further illustrated below in conjunction with the accompanying drawings.

FIG. 1 shows a schematic diagram of a structure of a defect-detectable fiber fabric according to some embodiments of the present disclosure. As shown in FIG. 1, the defect-detectable fiber fabric includes a plurality of bunches of fibers 101 and a plurality of braided threads 121, 122 configured to stitch together the fibers of each bunch of fibers 101. The plurality of braided threads include first braided threads 121 having a color different from a color of any of the plurality of bunches of fibers 101. Because of the first braided threads 121, when the fiber fabric is applied to the manufacture of blades of wind turbines, the defects such as wrinkles can be accurately and quickly identified by visual observation during the layering process and after curing. In order to better identify and position the defects, in the embodiments of the present disclosure, the distance between every two adjacent first braided threads is set in a range less than the acceptability for wrinkles. In this way, the wrinkles exceeding the acceptability for wrinkles can be identified by observing the straightness of two adjacent first braided threads with the naked eye. In some embodiments of the present disclosure, when one respective bunch of fibers of the plurality of bunches of fibers of the fiber fabric has a width of N mm, the distance between every two adjacent first braided threads 121 is set to range from 11N mm to 501N mm. In some embodiments, the distance between every two adjacent first braided threads 121 is set to range from 11N mm to 101N mm. In some embodiments, the distance between every two adjacent first braided threads 121 is set to range from 11N mm to 51N mm. Moreover, in order to better identify with the naked eye, the color of the first braided threads is selected from colors that are strongly contrasted with the color of the plurality of bunches of fibers. In some embodiments of the present disclosure, a relative color difference between the color of the first braided threads and the color of the plurality of bunches of fibers is greater than or equal to 3. The relative color difference is calculated based on color parameters output from color modes issued by CIELAB in 1976.

In the embodiments of the present disclosure, the defect-detectable fiber fabric may be monoaxial glass fiber fabric, biaxial glass fiber fabric, or triaxial glass fiber fabric. The defect-detectable fiber fabric may only include main-direction fibers, or may further include weft fibers. The main-direction fibers refer to the fibers that are arranged evenly and in parallel along the length direction of the blade, i.e. the zero-degree-direction, and the weft fibers are arranged to have an included angle with the main-direction fibers and substantially parallel to a width direction of the blade of the wind turbine. In some embodiments of the present disclosure, the main-direction fibers and the weft fibers are stitched together by the braided threads using for example tricot stitches, derivative tricot stitches, two-bar-derivative tricot stitches, or pillar stitches.

In some embodiments of the present disclosure, the main-direction fibers and/or the weft fibers are glass fibers. The glass fibers are usually white. Therefore, in some embodiments of the present disclosure, the first braided threads may have a color of non-white.

In some embodiments of the present disclosure, the main-direction fibers and the weft fibers are stitched together by the braided threads using tricot stitches. In other words, the braided threads are arranged along the zero-degree-direction of the fiber fabric. On this basis, in some embodiments of the present disclosure, the braided threads may be made of inorganic fibers such as glass fibers. In some other embodiments of the present disclosure, the braided threads may be made of synthetic organic fibers such as polyester fiber. The areal density, linear density and stitch lengths of the braided threads are not limited, but in order to optimize the braiding parameters of the fiber fabric, thereby increasing the fiber volume content in the blade of the wind turbine and reducing the resin consumption, in some embodiments of the present disclosure, the linear density of the braided threads is less than or equal to 150 D, and/or the stitch lengths of the braided threads are less than or equal to 5 mm.

In the embodiments of the present disclosure, the first braided threads of a same fiber fabric may have one or more colors. However, when the braided threads have excessive colors, the colors of the fiber fabric may be too miscellaneous, which is not conducive to the defect detection. Therefore, in some embodiments of the present disclosure, a number of the colors of the first braided threads of a same fiber fabric is less than or equal to 20. In some embodiments of the present disclosure, the first braided threads of a same fiber fabric have only one color.

Similarly, when the density of the first braided threads is too high, it is also not conducive to the defect detection with the naked eye in some large-area layering processes. Therefore, in some embodiments of the present disclosure, the fiber fabric further includes some second braided threads 122 having a color same as the color of the plurality of bunches of fibers 101. The ratio of the first braided threads to the second braided threads may be determined for example according to the area of the blade to be manufactured. In some embodiments of the present disclosure, the ratio of the first braided threads to the second braided threads ranges from 1:10 to 1:500. In some embodiments of the present disclosure, the ratio of the first braided threads to the second braided threads ranges from 1:10 to 1:100. In some embodiments of the present disclosure, the ratio of the first braided threads to the second braided threads ranges from 1:10 to 1:50.

Figure 2:
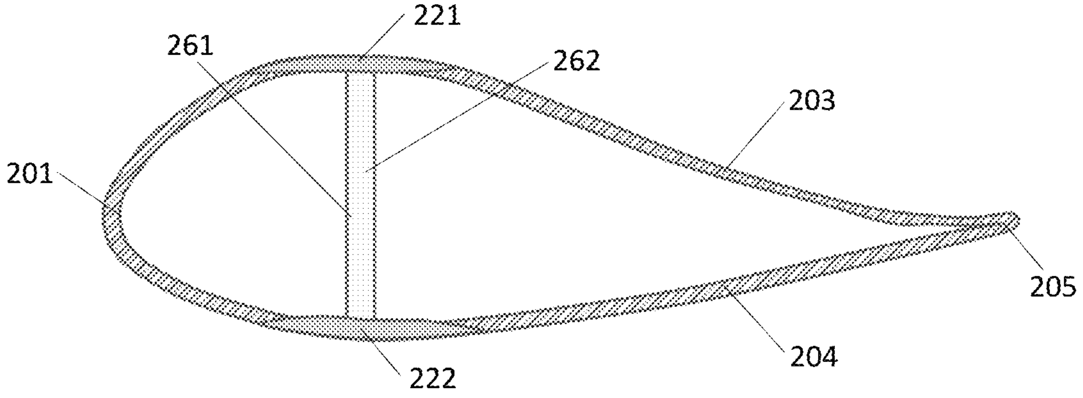
FIG. 2 shows a schematic diagram of a structure of a blade of a wind turbine to which the present disclosure is applicable.

The fiber fabric illustrated above may be applied to the manufacture of the housing of a blade of a wind turbine. FIG. 2 shows a schematic diagram of a structure of a blade of a wind turbine to which the present disclosure is applicable. As shown in FIG. 2, the blade includes a leading edge 201, main beams 221 and 222, a pressure face 203, a suction face 204 and a trailing edge 205. Moreover, two webs 261 and 262 are fixed between the two main beams 221 and 222. Any one of the main beams, the webs, the pressure face, the suction face, and the trailing edge may be manufactured by the fiber fabric provided in the embodiments of the present disclosure using layering and injection molding.

Generally, the housing of the blade includes a plurality of layers of the fiber fabric. In order to facilitate determination of the layer where the wrinkle defects are formed, in some embodiments of the present disclosure, first braided threads of one respective layer of the fiber fabric of the plurality of layers of the fiber fabric have a color different from colors of first braided threads of remaining layers of the fiber fabric of the plurality of layers of the fiber fabric. In this way, the layer where the defects are formed can be determined quickly according to the color of the braided threads on which bending or wrinkles occur. Moreover, the density of first braided threads of one respective layer of the fiber fabric of the plurality of layers of the fiber fabric may be different from the densities of first braided threads of remaining layers of the fiber fabric of the plurality of layers of the fiber fabric.

By arranging colored braided threads, the defect detection of the blade illustrated above may include the following operations.

First of all, during laying the fiber fabric, the profile-fitting degree and straightness of the fiber fabric may be visually determined by observing contours of the first braided threads with the naked eye. Under normal conditions, the two adjacent first braided threads should be substantially parallel to each other, or the straightness of the two adjacent first braided threads is substantially the same. Due to the fact that the distance between the two adjacent first braided threads is less than an acceptable width of a wrinkle, once there is a wrinkle having an excessive width is formed, the straightness of the two adjacent first braided threads must be affected, and an intersection may occur. Based on this, whether or not the wrinkle is formed can be quickly identified only by observing whether or not an intersection of the first braided threads occurs. In some embodiments of the present disclosure, a simple image recognition system may be provided to achieve the linkage with a monitoring system, thereby automatically identifying the defects during laying. In the process of defect detection, the laying operation may be carried out concurrently without interruption.

Then, after injection molding of the blade, the above-mentioned method may be executed, i.e. using observation with the naked eye or the linkage with the monitoring system, to observe the contours of the first braided threads arranged along an extension direction of the blade external to the blade, and determining whether any wrinkle defect is formed and determining positions of defects in response to the defects being formed. In this way, there is no need to polish the upper parts of wrinkles, thereby preventing irreparable damage.

At last, in a wind field, detection and positioning of the defects can still be realized using the colored braided threads.

In order to verify the effect of the fiber fabric, a warp knitted biaxial 600 fiber fabric is used to manufacture the blade of the wind turbine, and the acceptable standard for the wrinkles in the blade is less than 250 mm. The width of the fiber fabric is 1270 mm, including 100 D first braided threads and second braided threads of polyester material. The color of the first braided threads is purple, and the color of the second braided threads is the same as that of the fibers, i.e. white. The distance between two adjacent first braided threads is about 150 mm, which is less than the acceptable standard for the wrinkles. With this width, it can be calculated that there are nine first braided threads, and the ratio of the first braided threads to the second braided threads is 1:23. During layering using this fiber fabric, when a width of any wrinkle goes beyond the range of the distance between two adjacent first braided threads, the wrinkle is considered as a defect and needs to be repaired. After testing, compared with the fiber fabric without colored braided threads, the time taken for detecting wrinkles and straightness can be saved by 0.5 to 1 hour.

In order to further verify the effect of positioning defects after injection molding, nine types of fiber fabrics are used to manufacture blades, with the blades have a length of 76 m. The gram weights and/or sizing agents and/or braiding directions and/or fabric axial directions of the types of fiber fabrics are different from each other, and the respective braided threads of each type of fabric include non-white first braided threads and white second braided threads. The colors of the first braided threads are different from each other. Therefore, the blade includes first braided threads having nine colors. After molding and mold releasing of the blade, the layer(s) where the defects such as wrinkles are formed and the corresponding types of the fabrics can be still accurately determined using observation with the naked eye or the linkage with the monitoring system according to the colors of the braided threads. In this way, positioning and detection of the defects can be quickly achieved without irreparable damage, which greatly helps the inspection and maintenance of the blade.

Moreover, in a wind field, detection and positioning of the defects in the blade can still be achieved using the colored braided threads.

Although the embodiments of the present disclosure have been illustrated above, it shall be understood that these embodiments are only examples and not limitations. It is apparent to those skilled in the art that various combinations, modifications and changes can be made without departing from the spirit and scope of the present disclosure. Therefore, the width and scope of the present disclosure disclosed herein should not be limited by the exemplary embodiments illustrated above, but should be defined only in accordance with the appended claims and their equivalent substitutions.

What is claimed is:

1. A fiber fabric, comprising:

a plurality of main-direction fibers, arranged evenly and in parallel along a zero-degree-direction of the fiber fabric;

a plurality of weft fibers, each of the weft fibers arranged to have an included angle with each of the main-direction fibers; and a plurality of braided threads arranged along the zero-degree-direction of the fiber fabric and parallel to each other, wherein:

the plurality of main-direction fibers and the plurality of weft fibers are stitched together by the plurality of braided threads to form a plurality of fabric layers;

the plurality of braided threads include first braided threads arranged along an extension direction of the fiber fabric, each of the first braided threads having a color different from a color of any of the main-direction fibers and the weft fibers, and a respective distance between any two adjacent braided threads of the first braided threads is configured to make wrinkle defects formed in the plurality of fabric layers detectable; and the first braided threads are configured to allow determination of any wrinkle defect having been formed in the fiber fabric and positions of the wrinkle defect by visual observation of contours of the first braided threads.

2. The fiber fabric according to claim 1, wherein the respective distance between every two adjacent braided threads of the first braided threads is 11 to 501 times a width of one bunch of the main-direction fibers and the weft fibers.

3. The fiber fabric according to claim 1, wherein the respective distance between every two adjacent braided threads of the first braided threads is 11 to 101 times a width of one bunch of the main-direction fibers and the weft fibers.

4. The fiber fabric according to claim 1, wherein the respective distance between every two adjacent braided threads of the first braided threads is 11 to 51 times a width of one bunch of the main-direction fibers and the weft fibers.

5. The fiber fabric according to claim 1, wherein a relative color difference between the color of the first braided threads and the color of the main-direction fibers and the weft fibers is greater than or equal to 3, and the relative color difference is calculated based on color parameters output from color modes issued by CIELAB in 1976.

6. The fiber fabric according to claim 1, wherein the first braided threads have one or more colors.

7. The fiber fabric according to claim 1, wherein a number of colors of the first braided threads is less than or equal to 20.

8. The fiber fabric according to claim 1, wherein the plurality of braided threads further include second braided threads having a color same as the color of the main-direction fibers and the weft fibers.

9. The fiber fabric according to claim 8, wherein a ratio of the first braided threads to the second braided threads ranges from 1:10 to 1:500.

10. The fiber fabric according to claim 8, wherein a ratio of the first braided threads to the second braided threads ranges from 1:10 to 1:100.

11. The fiber fabric according to claim 8, wherein a ratio of the first braided threads to the second braided threads ranges from 1:10 to 1:50.

12. The fiber fabric according to claim 1, wherein the plurality of braided threads are made of glass fiber or polyester fiber.

13. The fiber fabric according to claim 1, wherein the fiber fabric is monoaxial glass fiber fabric, biaxial glass fiber fabric, or triaxial glass fiber fabric, and the main-direction fibers or the weft fibers are glass fiber having a color of white.

14. The fiber fabric according to claim 1, wherein the main-direction fibers and the weft fibers are stitched together by the braided threads using tricot stitches, derivative tricot stitches, two-bar-derivative tricot stitches, or pillar stitches.

* * * * *